United States Patent [19]
Ely

[11] Patent Number: 5,684,532
[45] Date of Patent: Nov. 4, 1997

[54] VIDEO CAMERA WITH IMPROVED ZOOM CAPABILITY

[75] Inventor: Reuel Andrew Ely, Plantation, Fla.

[73] Assignee: Sensormatic Electronics Corporation, Deerfield Beach, Fla.

[21] Appl. No.: 540,317

[22] Filed: Oct. 6, 1995

[51] Int. Cl.⁶ ............................................. A04N 5/232
[52] U.S. Cl. ................................ 348/240; 348/358
[58] Field of Search ............................ 348/240, 358, 348/169, 335; H04N 5/232

[56] References Cited

U.S. PATENT DOCUMENTS

| | | | |
|---|---|---|---|
| 4,337,482 | 6/1982 | Coutta | 358/108 |
| 5,325,206 | 6/1994 | Fujita et al. | 348/358 |
| 5,420,632 | 5/1995 | Yamagiwa | 348/240 |

FOREIGN PATENT DOCUMENTS

| | | | |
|---|---|---|---|
| 541092 | 5/1993 | European Pat. Off. | H04N 5/232 |
| 04316286 | 11/1992 | Japan | H04N 5/232 |
| 05130484 | 5/1993 | Japan | H04N 5/232 |
| 584404 | 10/1993 | Japan | H04N 5/232 |

*Primary Examiner*—Wendy Garber
*Attorney, Agent, or Firm*—Robin, Blecker, Daley & Driscoll

[57] ABSTRACT

A video camera is operated to obtain a very rapid change in magnification. A target degree of magnification is achieved by rapid change in an electronic zoom factor provided by an image signal processing circuit. Either before or after the change in electronic zoom factor, simultaneous off-setting changes are carried out in the electronic zoom factor and in a mechanical zoom factor provided by the camera's optical system. The simultaneous off-setting changes in the two zoom factors occur at a rate consistent with practical operation of the mechanical drive components for the camera's optical system.

20 Claims, 6 Drawing Sheets

VIDEO CAMERA WITH IMPROVED ZOOM CAPABILITY

FIELD OF THE INVENTION

The present invention is related to video cameras, and more particularly to video cameras which have an electronic zoom capability.

BACKGROUND OF THE INVENTION

It is well known to provide video cameras having a variable focal length to permit selective magnification of the image captured by the camera, thereby allowing the operator of the camera to "zoom in" on an object of interest. Typically the zoom capability is operated by actuating a zoom button, which causes a zoom lens motor to drive a zoom lens along the optical axis of the camera, thereby changing the focal length of the camera's optical system and causing an increase or decrease in magnification of the image. Commonly available video cameras provide a zoom capability with a maximum magnification of 10× or 12×.

It is also known to extend the effective zoom range of a video camera by providing a so-called "electronic zoom" capability. "Electronic zoom" is accomplished by processing an image signal generated in the camera so as to increase the scale of the signal, thereby magnifying the image which is viewed when the camera signal is displayed on a monitor or electronic range finder.

When video cameras are employed in security surveillance systems, it is often desirable that the zoom condition of the camera be changed very rapidly, either to zoom in on a scene of interest in the event of an alarm or the like, or to make a rapid transition from one scene to another in a predetermined sequence of surveillance scenes. However, when the zoom condition is changed by mechanically driving the zoom lens to change the focal length of the optical system, there are practical limits to the rapidity with which the change in magnification can be accomplished. For example, a time interval on the order of one second may be required to move the zoom lens from a position of minimum magnification to a position of maximum magnification. It can be contemplated to reduce this time interval by use of more powerful motors, heavy duty mechanical elements, and complex software feedback algorithms, but such modifications increase the cost of the camera, and significant limits remain in terms of the speed at which zoom adjustment may be carried out. Furthermore, driving optical system components at higher speeds tends to reduce the service life of the equipment. Also, rapid focal length changes may out-run the automatic focus capability of the camera, resulting in an unstable or poor-quality image.

It could also be contemplated to employ an electronic zoom capability instead of mechanically driving the optical system to change the degree of magnification. However, use of an electronic zoom reduces the resolution of the displayed image, and the loss of resolution becomes very significant if an electronic zoom is employed over the entire range of magnification commonly provided by driving the zoom lens.

OBJECTS AND SUMMARY OF THE INVENTION

It is accordingly an object of the invention to provide a video camera having a very rapid zoom adjustment and adequate image resolution at high magnification.

According to a first aspect of the invention, there is provided a method of operating a video camera which includes an optical system for forming an image, image pickup means for generating an image pickup signal representative of the image formed by the optical system, mechanical zoom means for mechanically driving the optical system to change a focal length of the optical system, and electronic zoom circuitry for processing the image pickup signal and outputting a processed image signal having a magnification characteristic that depends on the focal length of the optical system and the processing performed by the electronic zoom circuitry, with the method including the steps of driving the optical system of the camera so as to change the focal length of the optical system, and simultaneously processing the image pickup signal by means of the electronic zoom circuitry to compensate for the change in focal length resulting from the driving of the optical system, so that the magnification characteristic of the processed image signal is substantially unchanged during the driving of the optical system.

Further in accordance With this aspect of the invention, the optical system may be driven in a direction for increasing the focal length thereof, and as the focal length is increased, the electronic zoom circuitry reduces a degree of magnification imparted to the image pickup signal by the electronic zoom circuitry. Alternatively, the optical system may be driven in a direction for decreasing the focal length thereof, and as the focal length is decreased, the electronic zoom circuitry increases a degree of magnification imparted to the image signal by the electronic zoom circuitry.

Moreover, the method may include the further steps of detecting an image element present in the processed image signal, monitoring the size of the detected image element, and controlling at least one of the mechanical zoom mechanism and the electronic zoom circuitry in response to changes in the monitored size of the detected image element.

According to another aspect of the invention, there is provided a method of increasing a degree of magnification exhibited by an image signal output from a video camera from a first level of magnification to a second level of magnification greater than the first level of magnification, with the degree of magnification exhibited by the output image signal resulting from a combination of a mechanical zoom factor provided by an optical system of the camera and an electronic zoom factor provided by an electronic image processing circuit of the camera, the method including the steps of increasing the electronic zoom factor provided by the electronic image processing circuit so as to increase the degree of magnification from the first level to the second level, and, after such increase in the electronic zoom factor, reducing the electronic zoom factor provided by the electronic image processing circuit while simultaneously increasing the mechanical zoom factor provided by the optical system to substantially maintain the degree of magnification at the second level. The increase in the electronic zoom factor may be performed within a period of less than one-tenth second; for example, the increase in the electronic zoom factor may be performed within a period of one-thirtieth of a second (a standard video frame period).

With the method provided according to this aspect of the invention, an initial very rapid increase in magnification is obtained, and then the increased level of magnification is maintained over a period of time (on the order of one second) while the image resolution is improved by reducing the electronic zoom factor at the same time that an off-setting increase in the mechanical zoom factor occurs.

According to still another aspect of the invention, there is provided a method of decreasing a degree of magnification exhibited by an image signal output from a video camera from a first level of magnification to a second level of magnification lower than the first level of magnification, with the degree of magnification exhibited by the output image signal being the result of a combination of a mechanical zoom factor provided by an optical system of the camera and an electronic zoom factor provided by an electronic image processing circuit of the camera, and the method including the steps of decreasing the electronic zoom factor provided by the electronic image processing circuit so as to decrease the degree of magnification from the first level to the second level, and after the decrease in the electronic zoom factor, increasing the electronic zoom factor provided by the electronic image processing circuit while simultaneously decreasing the mechanical zoom factor provided by the optical system to substantially maintain the degree of magnification at the second level.

According to a further aspect of the invention, there is provided a method of decreasing a degree of magnification exhibited by an image signal output from a video camera from a first level of magnification to a second level of magnification lower than the first level of magnification, the degree of magnification exhibited by the output image signal being the result of a combination of a mechanical zoom factor provided by an optical system of the camera and an electronic zoom factor provided by an electronic image processing circuit of the camera, and the method including the steps of increasing the electronic zoom factor provided by the electronic image processing circuit while simultaneously decreasing the mechanical zoom factor provided by the optical system to substantially maintain the degree of magnification at the first level, and after the increase of the electronic zoom factor with the simultaneous decrease of the mechanical zoom factor, decreasing the electronic zoom factor so as to decrease the degree of magnification from the first level to the second level.

According to yet a further aspect of the invention, there is provided a variable-zoom video camera, including an optical system for forming an image, an image pickup device for generating an image pickup signal representative of the image formed by the optical system, an electronic image signal processing circuit for processing the image pickup signal to form a processed image signal, the processed image signal exhibiting a degree of magnification which results from a combination of a mechanical zoom factor provided by the optical system and an electronic zoom factor provided by the electronic image signal processing circuit, a mechanical zoom mechanism for driving the optical system so as to change a focal length of the optical system, thereby changing the mechanical zoom factor provided by the optical system, and control circuitry for controlling the mechanical zoom mechanism to change the focal length of the optical system, and for selectively simultaneously controlling the electronic image signal processing circuit so as to change the electronic zoom factor provided by the electronic image signal processing circuit in a manner to compensate for the change in the mechanical zoom factor provided by the optical system caused by the change in focal length and to maintain the degree of magnification exhibited by the processed image signal at a substantially constant level notwithstanding the change in focal length.

Further in accordance with the latter aspect of the invention, the control circuitry may control the mechanical zoom mechanism to drive the optical system in a direction for increasing a focal length of the optical system while controlling the electronic image signal processing circuit so that the electronic zoom factor is decreased as the focal length is increased.

Alternatively, the control circuitry may control the mechanical zoom mechanism to drive the optical system in a direction for decreasing a focal length of the optical system while controlling the electronic image signal processing circuit so that the electronic zoom factor is increased as the focal length is reduced.

Still further in accordance with this aspect of the invention, the video camera may include a detecting circuit for detecting an image element present in the processed image signal and a monitoring circuit for detecting changes in the size of the image element detected by the detecting circuit, with the control circuitry being responsive to the monitoring circuitry for controlling at least one of the mechanical zoom mechanism and the electronic image signal processing circuit in accordance with changes in the size of the image element detected by the monitoring circuit. It is contemplated that the detecting circuit and the monitoring circuit may both be constituted by a suitably programmed control device which also constitutes the control circuitry.

DESCRIPTION OF PREFERRED EMBODIMENTS

Preferred embodiments of the invention will now be described, initially with reference to FIG. 1.

Figure 1:
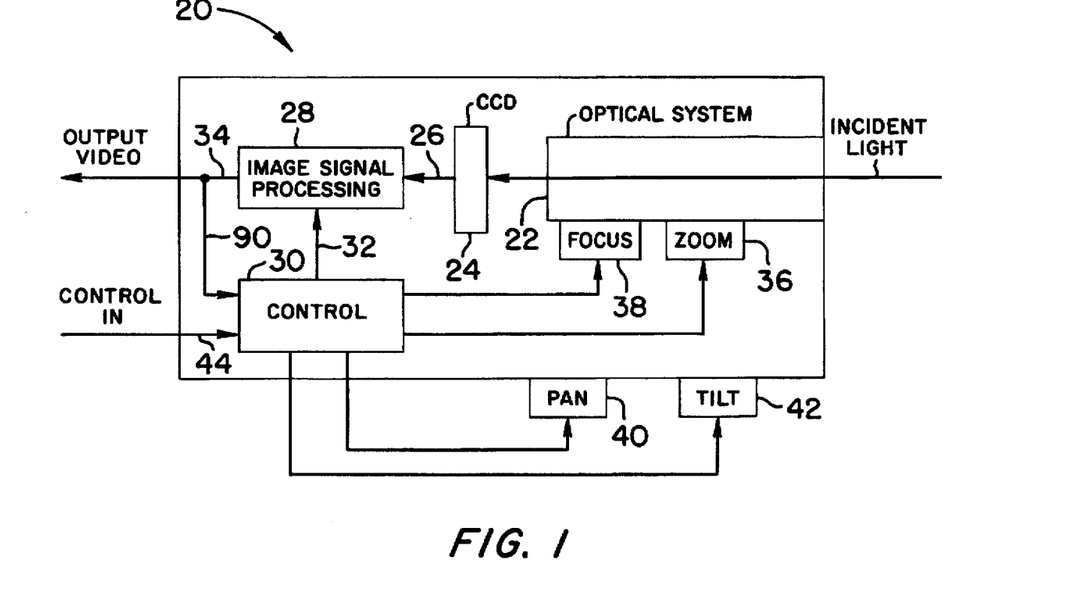
FIG. 1 is a schematic block diagram of a video camera in which the present invention is applied.

In FIG. 1, reference numeral 20 generally indicates a video camera. The video camera 20 includes an optical system 22 made up of a number of lenses which form incident light into an image to be captured by an image pickup element 24, which may be a CCD. The image pickup element 24 outputs an image signal 26 which represents the image formed by the optical system 22. The image pickup signal 26 is supplied to an image signal processing circuit 28.

A control circuit 30 generates an electronic zoom control signal 32 which is supplied to the image signal processing circuit 28. In accordance with the electronic zoom control signal 32, the image signal processing circuit 28 applies conventional electronic zoom processing to the image pickup signal 26 to apply an electronic zoom factor $Z_E$ to the image pickup signal. As a result, a processed image signal 34 output from the image signal processing circuit exhibits a degree of magnification, relative to the image pickup signal 26, which corresponds to the electronic zoom factor.

In addition to electronic zoom, the image signal processing circuit 28 may also perform other image signal processing functions conventionally provided in video cameras.

A zoom motor 36 and a focus motor 38 are associated with the optical system 22. Under the control of signals provided by the control circuit 30, the zoom motor 36 drives at least one lens included in the optical system 22 so as to change the focal length of the optical system 22, and thereby change a degree of magnification imparted to the image captured by the image pickup element 24.

The degree of magnification provided by the optical system 22 is sometimes referred to herein as the mechanical zoom factor $Z_M$. It will be understood that an overall degree of magnification M exhibited by an image formed by displaying the processed video signal 34 is the multiplicative product of the mechanical and electronic zoom factors. That is, $M=Z_M \cdot Z_E$.

The focus motor 38 operates in a conventional manner to vary a focus condition of the optical system 22, also under the control of control circuit 30.

A pan motor 40 and a tilt motor 42 are associated with the video camera 20. In response to respective control signals provided from the control circuit 30, the pan motor 40 and the tilt motor 42 are operative to vary a direction of view of the video camera 20.

Each of the components 22, 24, 28, 36, 38, 40 and 42 may be of conventional construction. The control circuit 30 may be constituted by a conventional microcontroller or microprocessor, operated under the control of software instructions provided in accordance with the invention. Although not separately shown, it will be understood that a program memory is provided to store the software program which controls the operation of the control circuit 30.

It is also contemplated that a single microcontroller or microprocessor provide at least some of the functions of the image signal processing circuit 28 in addition to those of the control circuit 30.

The control circuit 30 receives input control commands 44 that may be provided in a conventional manner from a user-operated control device (not shown) such as the TOUCHTRACKER camera control device available from the assignee of the present application. Alternatively, the control input commands 44 may be generated by an external device (not shown) which directs the camera 20 to vary its pan, tilt and zoom conditions according to a predetermined schedule of movements and target acquisitions. As another alternative, the camera 20 may itself contain a stored program according to which the camera varies its pan, tilt and zoom conditions to acquire a sequence of targets or views in a predetermined manner.

It will be assumed that in a first embodiment of the invention it is desired to maintain an optimum resolution in the output video signal (processed image signal 34) except during rapid zoom adjustment operations carried out in accordance with the invention. Consequently, the normal or "home" condition to be maintained in this embodiment is one in which the electronic zoom factor is maintained at unity (i.e., $Z_E=1$).

Figure 2:
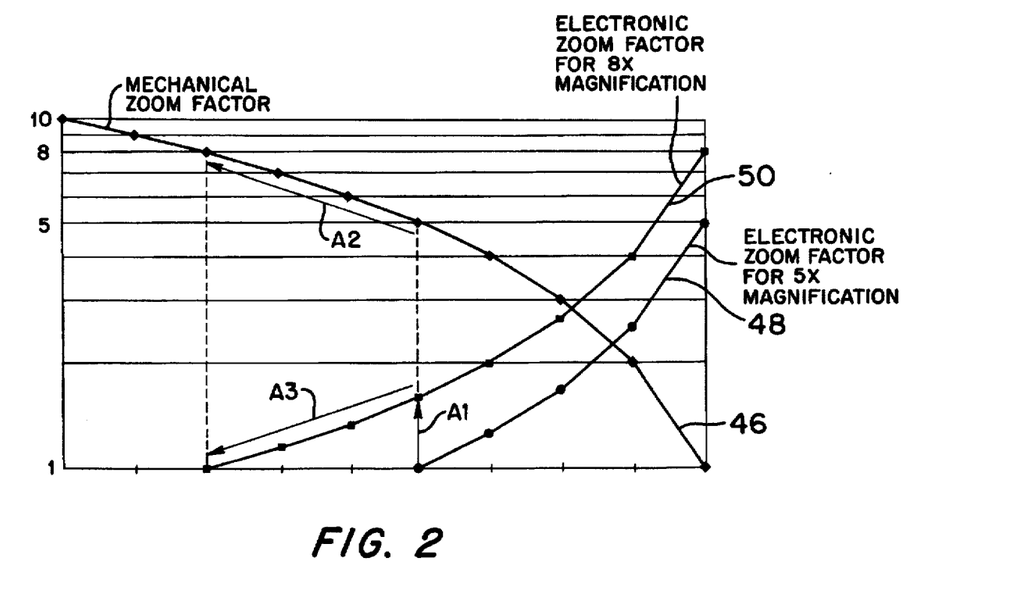
FIG. 2 is a graphic illustration of a zoom-in technique employed in a first embodiment of the invention.

There will now be described, with reference to FIGS. 2 and 8, an operation carried out in the first embodiment of the invention whereby the degree of magnification exhibited by the output video signal is rapidly increased from 5× to 8×. In accordance with the assumption noted above, prior to the operation, the electronic zoom factor $Z_E$ has a value of unity ($Z_E=1$) and the mechanical zoom factor was accordingly at a value of 5. Referring now to FIG. 2, a curve 46 represents a range of mechanical zoom factors from unity to 10×. A curve 48 represents values of the electronic zoom factor $Z_E$ to be provided to achieve M=5 for corresponding values of $Z_M$. In particular, points on curve 48 correspond to the appropriate values of $Z_M$ needed to provide 5× magnification, given values of $Z_E$ which are vertically above the respective points on curve 48. Similarly, curve 50 represents values of Zs required to provide 8× magnification for corresponding respective values of $Z_M$.

In accordance with the invention, at a time at which the magnification M is to be increased from 5× to 8×, the control circuit 30 outputs a signal 32 to the image signal processing circuit 28 such that the electronic zoom factor $Z_E$ is rapidly increased from unity to 1.6, as indicated by arrow A1 in FIG. 2. The increase in the electronic zoom factor $Z_E$ may be performed virtually instantaneously, say within one frame period of the output video signal, which corresponds to one-thirtieth of a second. As a result of this increase in the electronic zoom factor $Z_E$, the overall degree of magnification M exhibited by the output video signal is increased from 5× to 8×, although with some decrease in resolution. Thereafter, to return the resolution in the output video signal to the desired high degree of resolution, the mechanical zoom factor $Z_M$ is increased from 5 to 8 at a rate consistent with proper operation of the zoom motor 36 and the optical system 22, and, simultaneously, the electronic zoom factor $Z_E$ is reduced from 1.6 to unity. The increase in the mechanical zoom factor is illustrated in FIG. 2 by arrow A2, and the compensating decrease in the electronic zoom factor is illustrated by the arrow A3. It will be appreciated that the decrease in the electronic zoom factor illustrated by arrow A3 is performed at a much lower rate than the rate at which the electronic zoom factor was previously increased in the operation represented by arrow A1. Moreover, the operations respectively indicated by arrows A2 and A3 are carried out so that the magnification $M=Z_M \times Z_E$ is maintained at a value of 8.

In this way, the first embodiment of the invention achieves a change in zoom condition at a much faster rate than can be practically achieved by changing the focal length of the optical system, and then, after the rapid zoom operation, the resolution of the output signal is recovered by reducing the electronic zoom factor to unity while providing a compensating increase in the mechanical zoom factor, both at a rate that accommodates practical limitations on the operation of the mechanical components that change the focal length of the optical system.

Figure 8:
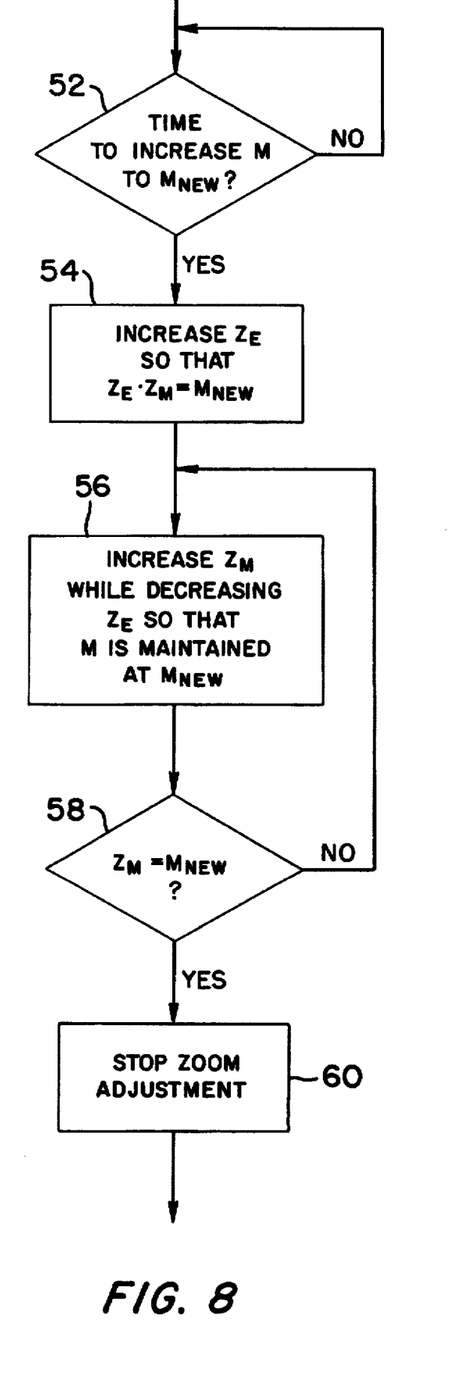
FIG. 8 is a flow chart of a software routine for performing the zoom-in technique of FIG. 2.

A software routine provided to carry out the zoom-in operation of FIG. 2 is illustrated in flow chart form in FIG. 8. The routine of FIG. 8 begins with a step 52 at which it is determined whether the time has come to increase the magnification M from a current level $M_{OLD}$ to a new desired level $M_{NEW}>M_{OLD}$. An affirmation determination as step 52 may be made either in response to an input signal generated in real time by a human operator or by a sensor device which detects an alarm condition, or may be the product of a predetermined program for changing the scene to be captured by the camera. In any case, when the time to increase the magnification arrives, step 54 follows step 52. Step 54 corresponds to the rapid increase in $Z_E$ indicated by the arrow A1 in FIG. 2. Following step 54 is step 56, which corresponds to the off-setting operations (arrows A2 and A3) by which $Z_M$ is increased while $Z_E$ is decreased, with the magnification maintained at the target level $M_{NEW}$. Step 58, which follows step 56, is a decision block at which it is determined whether the mechanical zoom factor $Z_M$ has reached the target magnification level $M_{NEW}$. If not, step 56 continues. Otherwise, step 60 follows step 58. At step 60 the off-setting zoom adjustment operations are ended, since the mechanical zoom factor $Z_M$ has reached the target $M_{NEW}$, which, of course, corresponds to the desired home condition of $Z_E=1$.

Figure 3:
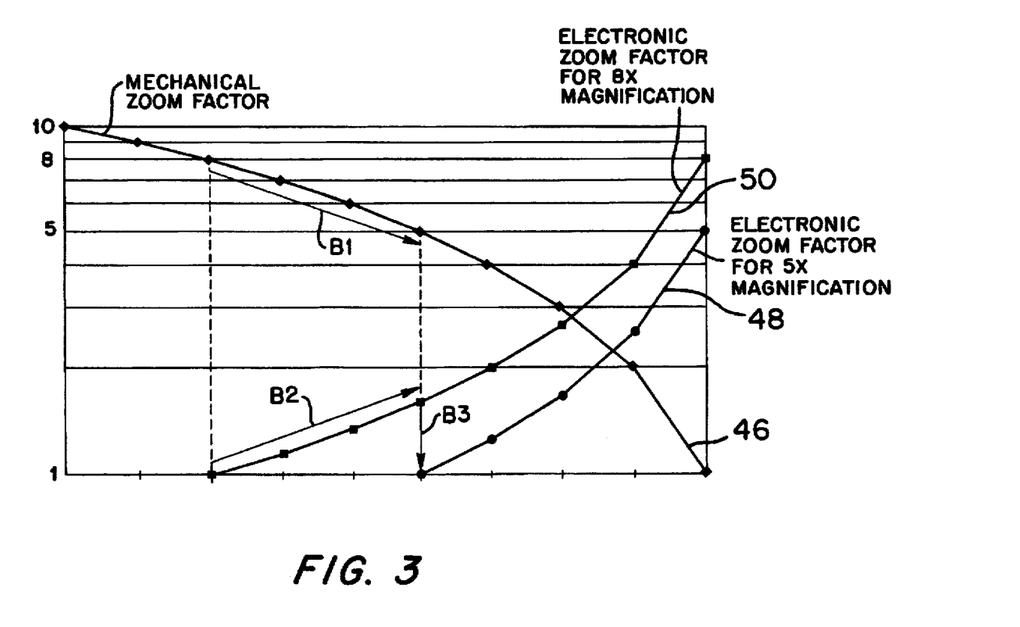
FIG. 3 is a graphic illustration of a zoom-out technique employed in the first embodiment of the invention.

FIG. 3 illustrates a zoom-out operation performed in the first embodiment of the invention. As will be seen, the zoom-out operation of FIG. 3 requires a priori knowledge of when the reduction in magnification is to occur, and accordingly cannot be performed in response to unpredictable operator input or alarm signals. Rather, the operation of FIG. 3 is carried out at a predetermined timing as part of a change in view directed under control of a stored program.

In the operation of FIG. 3, it is desired to reduce the degree of magnification M from 8× to 5×. Starting at a predetermined point in time prior to the time at which it is desired to reduce the degree of magnification, the electronic zoom factor $Z_E$ is increased from a value of unity ($Z_E=1$) to a value of 1.6, as indicated by the arrow B2 in FIG. 3, while at the same time an off-setting reduction in the mechanical zoom factor $Z_M$ from 8 to 5 takes place, as indicated by the arrow B1. Both of the increase in the electronic zoom factor and the decrease in the mechanical zoom factor are carried out over a period of time that is sufficiently long to accommodate the speed at which the mechanical components of the optical system can practically be moved. Also, the time interval between the commencement of the off-setting operations indicated by arrows B1 and B2 and the time at which the zoom-out operation is to occur should correspond to the time period required for the off-setting operations. Moreover, the increase in electronic zoom factor and the decrease in mechanical zoom factor are coordinated so that the total magnification M is maintained at substantially 8×.

It will be recognized that a loss of resolution occurs as the electronic zoom factor is increased. However, the increase in the electronic zoom factor may be overlapped in time with a predetermined change in direction of view of the camera, in which case the loss of resolution may not be very noticeable. In any event, after completion of the increase in electronic zoom factor and decrease in mechanical zoom factor indicated, respectively, by arrows B2 and B1, the electronic zoom factor is reduced from 1.6 to 1 within a very short time (e.g., one frame period), as indicated by arrow B3. As a result, the overall degree of magnification M is rapidly reduced from 8× to 5× and optimum image resolution is restored.

Figure 9:
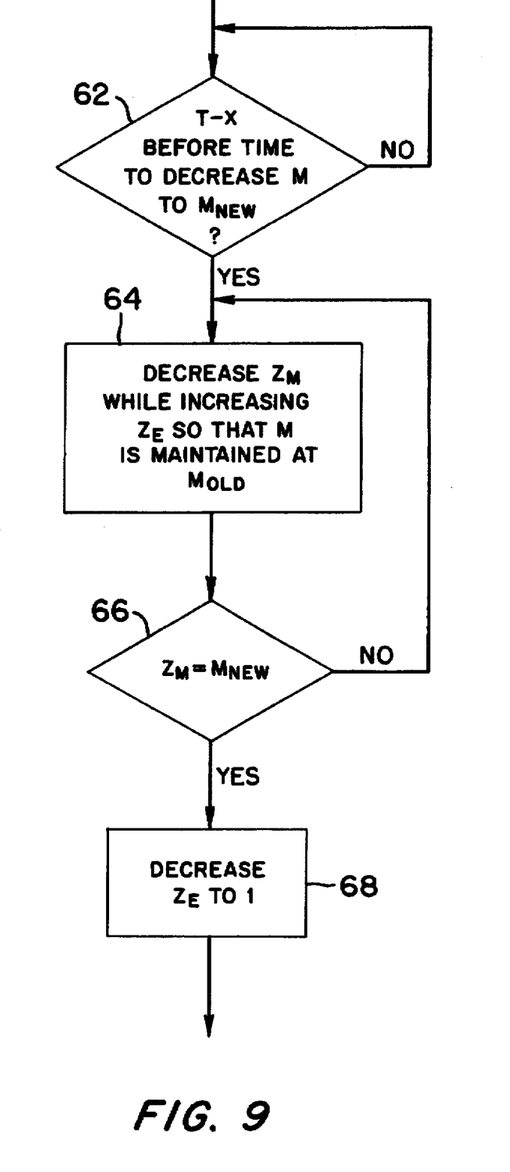
FIG. 9 is a flow chart of a software routine for performing the zoom-out technique of FIG. 3.

A software routine for carrying out the operations of FIG. 3 is illustrated in flow chart form in FIG. 9. The routine of FIG. 9 begins with a step 62, at which it is determined whether it is the predetermined time before the time at which the decrease in magnification is to occur. When this time is reached, step 64 occurs. In step 64, the operations indicated by arrows B1 and B2 take place. The next step is step 66, at which it is determined whether the operations indicated by the arrows B1 and B2 are completed. If so, step 68 follows, in which the decrease in the electronic zoom factor indicated by arrow B3 takes place.

A second embodiment of the invention will now be described with reference to FIGS. 4, 5, 10 and 11. In the second embodiment, the idle or home value for the electronic zoom factor is maintained at a level higher than unity, so that, to some extent, the second embodiment is capable of nearly instantaneous zoom-out, as well as nearly instantaneous zoom-in. In particular, the second embodiment is arranged so that the home value for the electronic zoom factor $Z_E$ is the square root of the present overall degree of magnification M.

Figure 4:
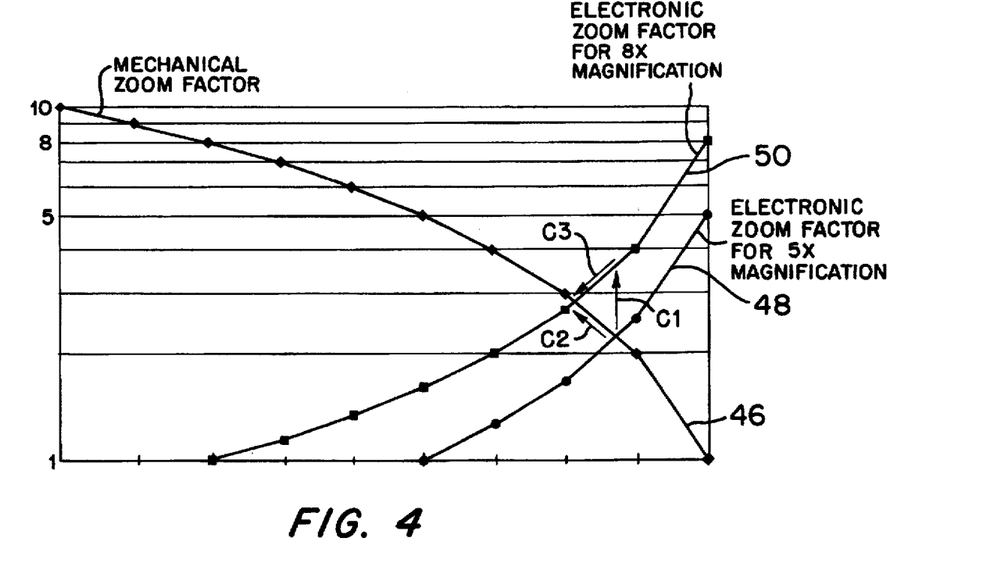
FIG. 4 graphic illustration of a zoom-in technique employed in a second embodiment of the invention.

FIG. 4 illustrates operations required to increase the overall magnification from 5× to 8×. In FIG. 4, the operations respectively represented by the arrows C1, C2 and C3 correspond to the operations indicated by the arrows A1, A2 and A3 in FIG. 2, except that in the operation indicated by arrow C1, the electronic zoom factor $Z_E$ is increased from the value $\sqrt{5}$ to the value $8+\sqrt{5}$ (rather than increasing from unity to 1.6 as in FIG. 2). Since the mechanical zoom factor is maintained at a value of $\sqrt{5}$ during the operation indicated by arrow C1, it will be recognized that C1 results in a very rapid increase in the overall level of magnification from 5× to 8×. Correspondingly, the subsequent reduction in electronic zoom factor $Z_E$, represented by the arrow C3, is from the value $8+\sqrt{5}$ down to $\sqrt{8}$, while the mechanical zoom factor $Z_M$ is increased, as indicated by the arrow C2, from $\sqrt{5}$ to $\sqrt{8}$. As in FIG. 2, the operations indicated by the arrows C2 and C3 of FIG. 4 are carried out at a rate that accommodates the speed at which the optical system 22 can practically be driven.

Figure 5:
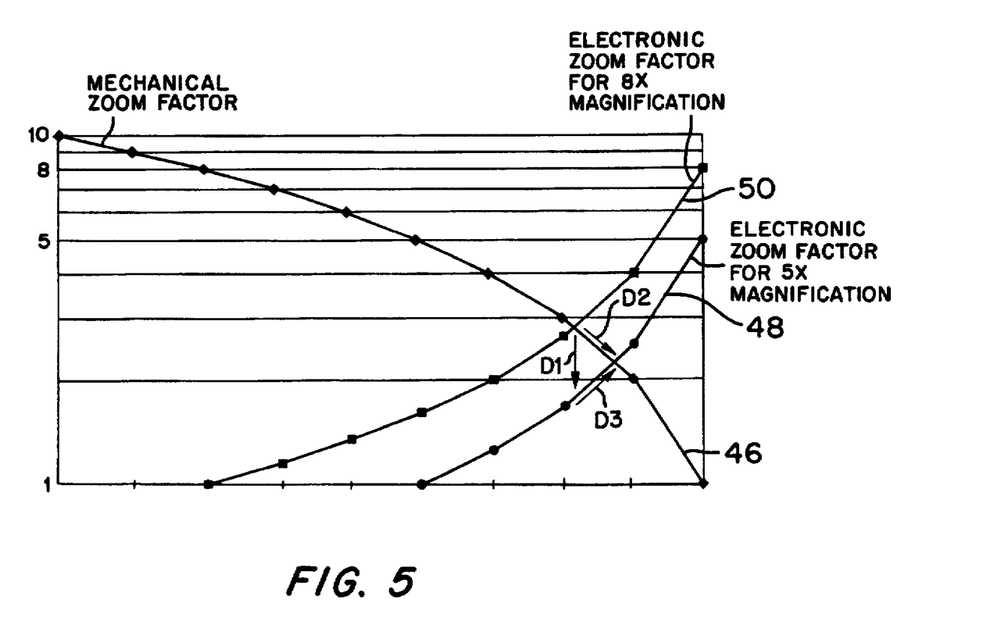
FIG. 5 is a graphic illustration of a zoom-out technique employed in the second embodiment of the invention.

FIG. 5 illustrates how the second embodiment of the invention can be operated to very rapidly decrease the degree of magnification, without a preparatory increase in the electronic zoom factor (as was required for the operation of FIG. 3). In particular, FIG. 5 carries out a very rapid decrease in overall magnification from 8× to 5× by reducing the electronic zoom factor $Z_E$ from $\sqrt{8}$ to $5+\sqrt{8}$, as represented by the arrow D1. Following the operation represented by arrow D1, the mechanical zoom factor $Z_M$ is decreased from $\sqrt{8}$ to $\sqrt{5}$, as indicated by the arrow D2, while the electronic zoom factor $Z_E$ is compensatingly increased from $5+\sqrt{8}$ to $\sqrt{5}$ (as indicated by the arrow D3), so that the overall magnification M is maintained at 5×. Again, of course, the operations indicated by the arrows D2 and D3 are carried out at a speed which can be practically supported by the components which mechanically drive the optical system.

Figure 10:
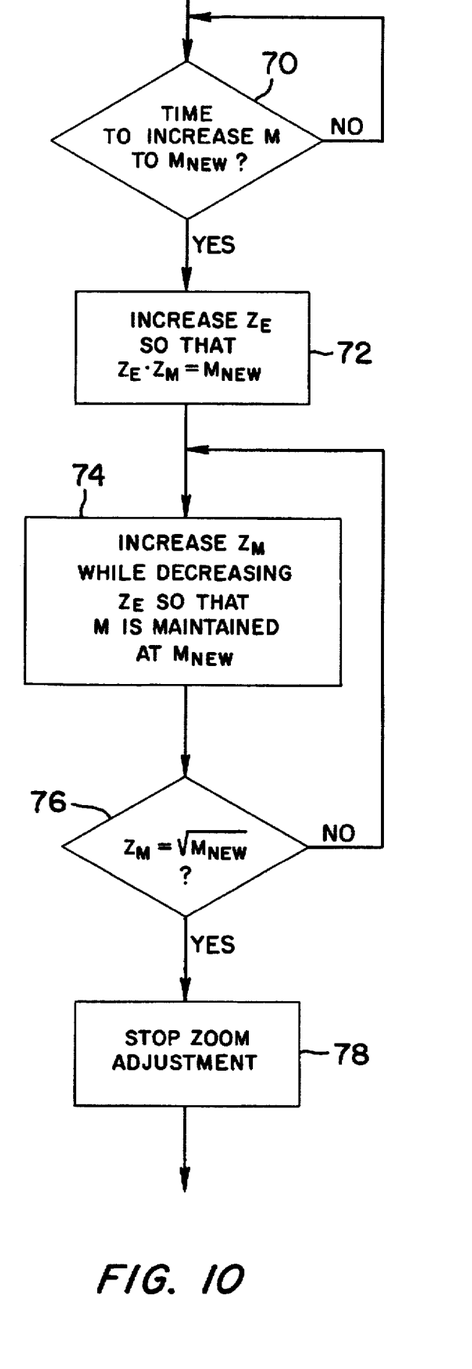
FIG. 10 is a flow chart of a software routine for performing the zoom-in technique of FIG. 4.
Figure 11:
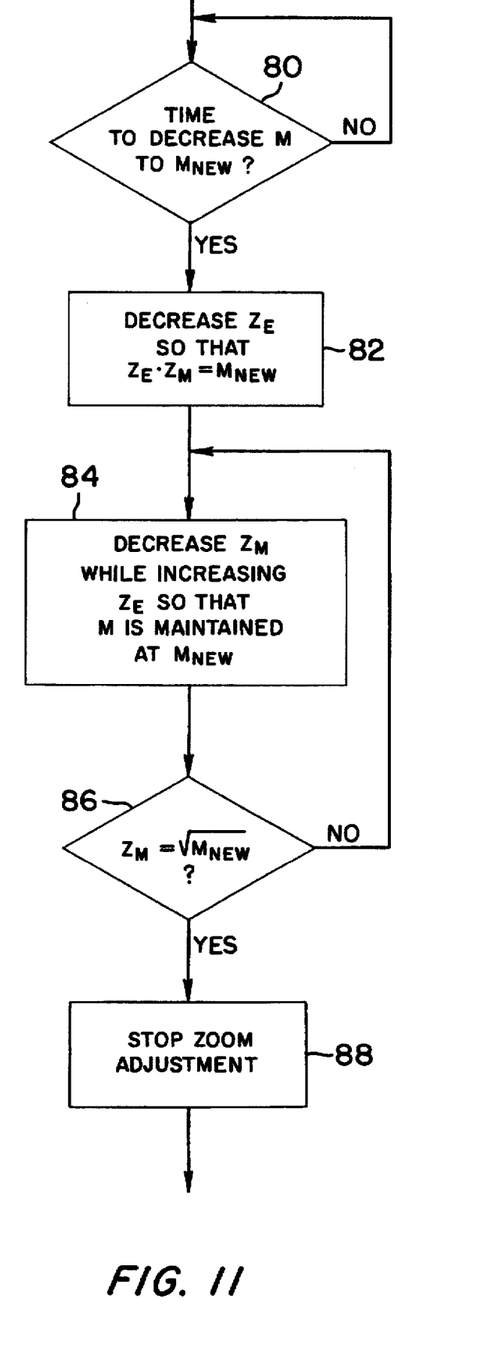
FIG. 11 is a flow chart of a software routine for performing the zoom-out technique of FIG. 5.

The respective software routines for carrying out the operations of FIGS. 4 and 5 are illustrated by FIGS. 10 and 11. The routine of FIG. 10 is made up of steps 70–78, which are respectively similar to steps 52–60 of FIG. 8, and need not be described in detail except to note that in step 76 the target value of the mechanical zoom $Z_M$ is set as the square root of the target degree of magnification (rather than the target magnification itself, as in the routine of FIG. 8).

FIG. 11, which is made up of steps 80 through 88, is essentially the mirror image of the routine of FIG. 10, and accordingly is believed to be readily understandable without further description.

The second embodiment can be understood as trading off resolution for the ability to obtain very rapid reduction in magnification within certain ranges. Since the "home" value for the electronic zoom factor $Z_E$ varies in the second embodiment depending on the current magnification ($Z_E=\sqrt{M}$ for idle conditions), it will be understood that the resolution also varies.

Figure 6:
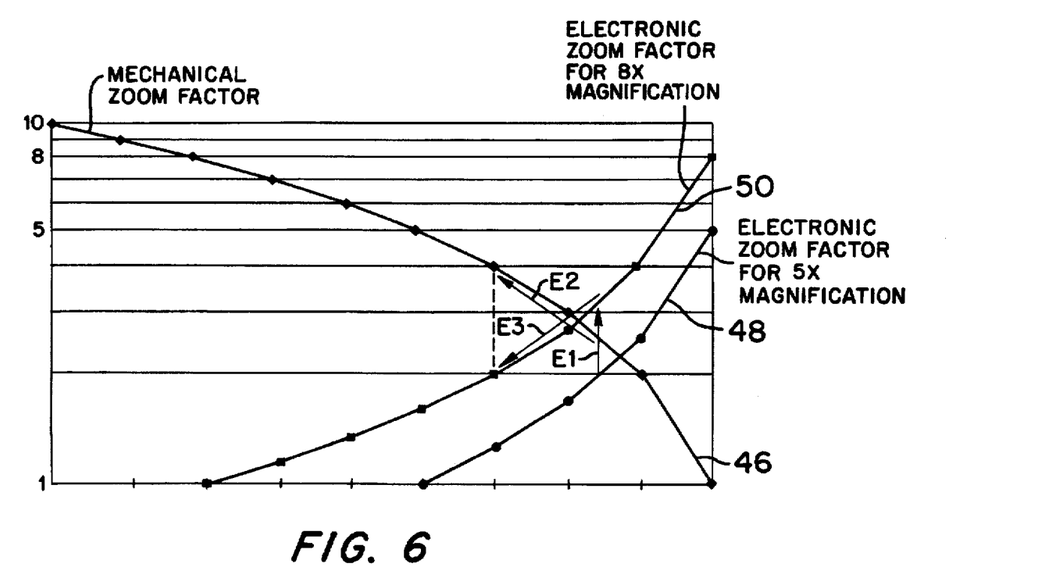
FIG. 6 is a graphic illustration of a zoom-in technique employed in a third embodiment of the invention.
Figure 7:
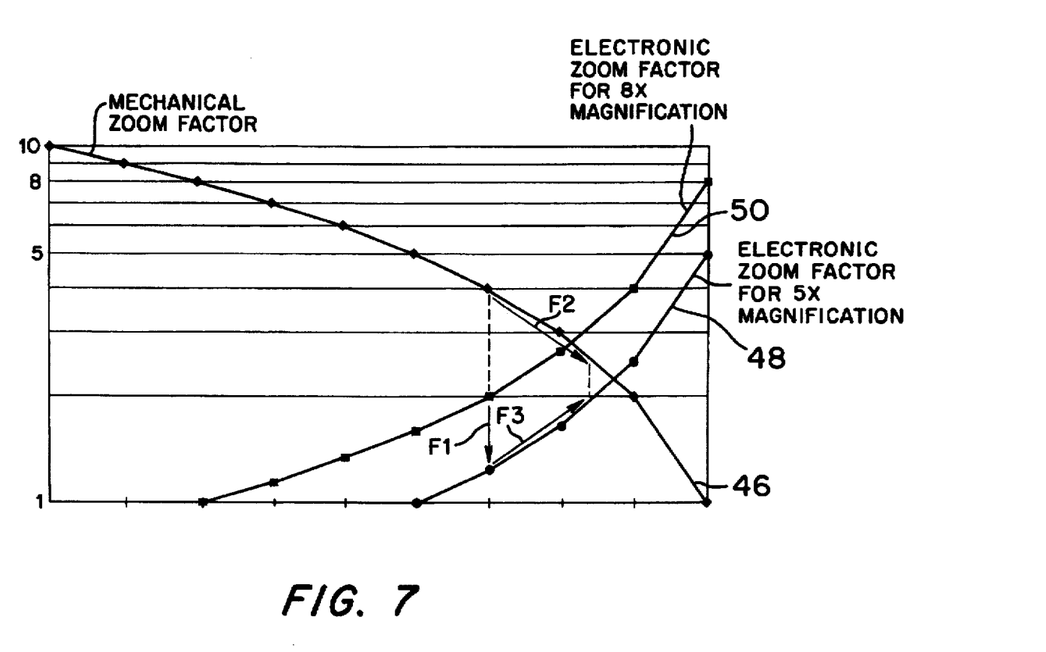
FIG. 7 is a graphic illustration of a zoom-out technique employed in the third embodiment of the invention.

In a third embodiment of the invention, illustrated by FIGS. 6 and 7, essentially the same trade off is made, in order to obtain a capability for rapid zoom-out operations, but the idle or home resolution is fixed by selecting a fixed home value of the electronic zoom factor greater than unity, such as $Z_E=2$. Accordingly, as shown in FIG. 6, when the magnification M is to be rapidly increased from 5× to 8×, the electronic zoom factor $Z_E$ is rapidly increased from 2 to 3.2, as indicated by the arrow E1. Then, the mechanical zoom factor $Z_M$ is increased from 2.5 to 4 (as indicated by the arrow E2), as the electronic zoom factor $Z_E$ is compensatingly decreased from 3.2 back to its target value of 2 (as indicated by the arrow E2).

FIG. 7 illustrates operation of the third embodiment to rapidly decrease the magnification M from 8× to 5×. Initially, as indicated by arrow F1, the electronic zoom factor $Z_E$ is rapidly decreased from 2 to 1.25, in order to accomplish a rapid decrease in magnification. Then the mechanical zoom factor $Z_M$ is ramped downward from 4 to 2.5, as indicated by the arrow F2, while the electronic zoom factor $Z_E$ is compensatingly ramped upwards (arrow F3) from 1.25 to its target value of 2. The software routines provided to carry out the operations in FIGS. 6 and 7 are respectively the same as those shown in FIGS. 10 and 11, except that the target value of $Z_M$ (shown in steps 76 and 86), would be $M_{NEW}\div 2$, rather than $\sqrt{M_{NEW}}$.

It is contemplated to perform the off-setting changes in the mechanical and electronic zoom factors (steps 56, 64, 74, and 84) under open loop control. Alternatively, it is contemplated to provide a feedback signal to assure proper coordination of the changes in the mechanical and electronic zoom factors so that the overall magnification M remains unchanged. For this purpose, the processed image signal 34 outputted from the image signal processing circuit 28 may be provided as an input signal to control circuit 30, as indicated at reference numeral 90 in FIG. 1.

Figure 12:
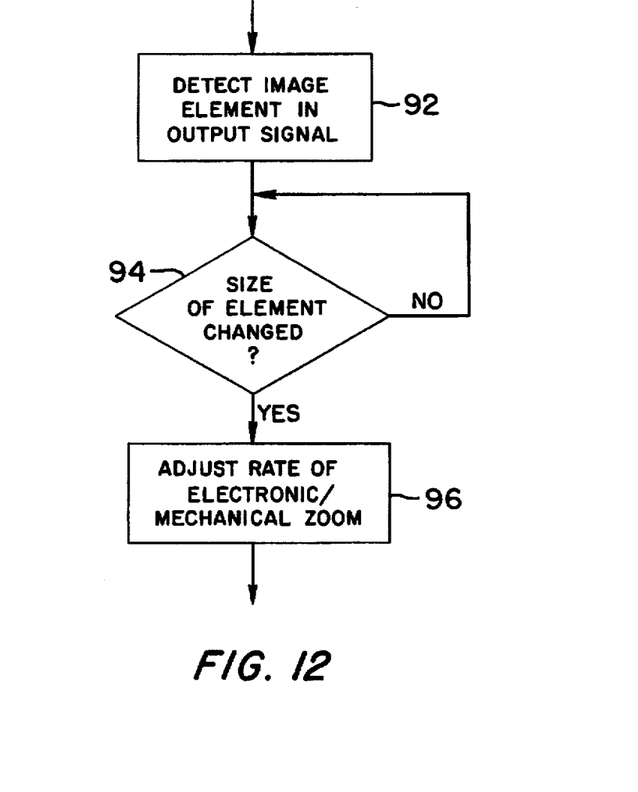
FIG. 12 is a flow chart illustrating a software routine which may be employed according to the invention to provide feedback while carrying on off-setting mechanical and electrical zoom operations.

Use of the processed image signal 34 as a feedback signal by the control circuit 30 is illustrated in flow chart form in FIG. 12. Initially, at step 92, the control circuit 30 detects an image element in the signal 34 in accordance with a conventional image analysis technique. For example, the analysis performed at step 92 may include a known feature extraction algorithm such as an edge extraction algorithm. Step 94 then follows step 92. At step 94, the control circuit 30 determines whether the size of the detected image element has changed. If so, step 96 follows, in which the control circuit 30 adjusts at least one of the rate at which the electronic zoom factor is being changed, or the rate at which the mechanical zoom factor is being changed, so that the size of the detected element is returned to its initially detected size. In this way, the control circuit 30 uses the processed image signal to maintain proper coordination of the electronic and mechanical zoom factors during simultaneous off-setting adjustment of those factors.

It is to be understood that the feedback technique illustrated in FIG. 12 may be carried out as a part of the steps 56, 64, 74 and 84 which were previously discussed.

It is to be understood that the initial and target values of M shown in FIGS. 2–7 are merely examples of many zoom-in and zoom-out operations that can be carried out in the above-described embodiments of the invention. In addition, it is contemplated to provide alternative idle or home values of the electronic zoom factor $Z_E$ other than the values 1, 2 or $\sqrt{M}$ as indicated in the above-described embodiments.

The invention has been described in the context of a video camera employed in a security surveillance system. Nevertheless, it is also contemplated to use the invention in other applications, including consumer camcorders, in which it is desired to permit very rapid zoom operations without unduly compromising image resolution over prolonged periods of time.

Furthermore, although the above embodiments have been described in connection with a camera provided with pan and tilt capabilities, it is also contemplated to apply the present invention in cameras that are hand held or fixed in terms of direction of view.

Various other changes to the foregoing video camera apparatus and modifications in the described practices may be introduced without departing from the invention. The particularly preferred methods and apparatus are thus intended in an illustrative and not limiting sense. The true spirit and scope of the invention is set forth in the following claims.

What is claimed is:

1. A method of operating a video camera which includes an optical system for forming an image, image pickup means for generating an image pickup signal representative of the image formed by the optical system, mechanical zoom means for mechanically driving the optical system to change a focal length of the optical system, and electronic zoom means for processing the image pickup signal and outputting a processed image signal having a magnification characteristic that depends on the focal length of the optical system and the processing performed by the electronic zoom means, the method comprising the steps of:

driving the optical system of the camera so as to change the focal length of the optical system;

simultaneously with said driving step, processing the image pickup signal by means of the electronic zoom means to compensate for said change in focal length resulting from said driving step so that the magnification characteristic of the processed image signal is substantially unchanged during said driving step;

and simultaneously with said driving and signal processing steps:

detecting an image element present in the processed image signal;

monitoring the size of the detected image element; and controlling at least one of the mechanical zoom means and the electronic zoom means, in response to changes in the monitored size of the detected image element, to maintain the magnification characteristic of the processed image signal substantially unchanged.

2. A method according to claim 1, wherein said optical system is driven in a direction for increasing the focal length thereof, and, as said focal length is increased, said electronic zoom means reduces a degree of magnification imparted to the image pickup signal by the electronic zoom means.

3. A method according to claim 1, wherein said optical system is driven in a direction for decreasing the focal length thereof, and, as said focal length is decreased, said electronic zoom means increases a degree of magnification imparted to the image pickup signal by the electronic zoom means.

4. A method according to claim 1, wherein said detecting step includes performing an edge extraction algorithm with respect to the processed image signal.

5. A method of changing a degree of magnification exhibited by an image signal output from a video camera, said degree of magnification exhibited by said output image signal resulting from a combination of a mechanical zoom factor provided by an optical system of the camera and an electronic zoom factor provided by an electronic image processing circuit of the camera, the method comprising the steps of:

increasing the electronic zoom factor provided by the electronic image processing circuit so as to increase said degree of magnification from a first level of magnification to a second level of magnification greater than said first level of magnification;

after said increasing step, reducing the electronic zoom factor provided by the electronic image processing circuit while simultaneously increasing the mechanical zoom factor provided by the optical system to substantially maintain said degree of magnification at said second level;

ending said reducing step so that the electronic zoom factor is maintained at a level substantially greater than unity; and after maintaining the electronic zoom factor at said level substantially greater than unity, reducing the electric zoom factor from said level substantially greater than unity, without changing the mechanical zoom factor, to reduce said degree of magnification from said second level.

6. A method according to claim 5, wherein said step of increasing the electronic zoom factor is performed within a period of less than one-tenth second.

7. A method according to claim 6, wherein said step of increasing the electronic zoom factor is performed within a period of substantially one-thirtieth second.

8. A method of decreasing a degree of magnification exhibited by an image signal output from a video camera from a first level of magnification to a second level of magnification lower than said first level of magnification, said degree of magnification exhibited by said output image signal resulting from a combination of a mechanical zoom factor provided by an optical system of the camera and an electronic zoom factor provided by an electronic image processing circuit of the camera, the method comprising the steps of:

decreasing the electronic zoom factor provided by the electronic image processing circuit so as to decrease said degree of magnification from said first level to said second level; and after said decreasing step, increasing the electronic zoom factor provided by the electronic image processing circuit while simultaneously decreasing the mechanical zoom factor provided by the optical system to substantially maintain said degree of magnification at said second level.

9. A method of decreasing a degree of magnification exhibited by an image signal output from a video camera from a first level of magnification to a second level of magnification lower than said first level of magnification, said degree of magnification exhibited by said output image signal resulting from a combination of a mechanical zoom factor provided by an optical system of the camera and an electronic zoom factor provided by an electronic image processing circuit of the camera, the method comprising the steps of:

increasing the electronic zoom factor provided by the electronic image processing circuit while simultaneously decreasing the mechanical zoom factor provided by the optical system to substantially maintain said degree of magnification at said first level; and after said step of increasing the electronic zoom factor while decreasing the mechanical zoom factor, decreasing the electronic zoom factor so as to decrease said degree of magnification from said first level to said second level.

10. A method according to claim 9, wherein said step of decreasing the electronic zoom factor is performed within a period of less than one-tenth second.

11. A method according to claim 10, wherein said step of decreasing the electronic zoom factor is performed within a period of substantially one-thirtieth second.

12. A method according to claim 9, wherein the electronic zoom factor is substantially unity immediately before said step of increasing the electronic zoom factor.

13. A method according to claim 9, wherein the electronic zoom factor is reduced to substantially unity during said step of decreasing the electronic zoom factor.

14. A variable-zoom video camera, comprising:

an optical system for forming an image;

image pickup means for generating an image pickup signal representative of the image formed by the optical system;

electronic image signal processing means for processing the image pickup signal to form a processed image signal, said processed image signal exhibiting a degree of magnification which results from a combination of a mechanical zoom factor provided by said optical system and an electronic zoom factor provided by said electronic image signal processing means;

mechanical zoom means for driving the optical system so as to change a focal length of said optical system, thereby changing the mechanical zoom factor provided by said optical system;

control means for controlling said mechanical zoom means to change the focal length of the optical system, and for selectively simultaneously controlling said electronic image signal processing means so as to change the electronic zoom factor provided by said electronic image signal processing means in a manner to compensate for the change in the mechanical zoom factor provided by said optical system caused by said change in focal length and to maintain the degree of magnification exhibited by said processed image signal at a substantially constant level notwithstanding said change in focal length;

detecting means for detecting an image element present in the processed image signal; and monitoring means for detecting changes in the size of the image element detected by said detecting means;

said control means being responsive to said monitoring means for controlling at least one of said mechanical zoom means and said electronic image signal processing means in accordance with changes in the size of the image element detected by said monitoring means, while maintaining at substantially a constant level the degree of magnification exhibited by said processed image signal.

15. A video camera according to claim 14, wherein said control means controls said mechanical zoom means to drive said optical system in a direction for increasing a focal length of said optical system while controlling said electronic image signal processing means, as said focal length is increased, so that said electronic zoom factor is decreased.

16. A video camera according to claim 14, wherein said control means controls said mechanical zoom means to drive said optical system in a direction for decreasing a focal length of said optical system while controlling said electronic image signal processing means, as said focal length is reduced, so that said electronic zoom factor is increased.

17. A video camera according to claim 14, wherein said detecting means includes means for performing an edge extraction algorithm with respect to the processed image signal.

18. A video camera according to claim 14, wherein said control means operates to increase the degree of magnification exhibited by the processed image signal from a first level of magnification to a second level of magnification greater than said first level of magnification by initially controlling the electronic image signal processing means to increase the electronic zoom factor so as to increase said degree of magnification from said first level to said second level, and then controlling the electronic image signal processing means to reduce the electronic zoom factor while simultaneously controlling the mechanical zoom means to increase the mechanical zoom factor to substantially maintain said degree of magnification at said second level.

19. A video camera according to claim 14, wherein said control means operates to decrease the degree of magnification exhibited by the processed image signal from a first level of magnification to a second level of magnification lower than said first level of magnification by initially controlling the electronic image signal processing means to decrease the electronic zoom factor so as to decrease said degree of magnification from said first level to said second level, and then controlling the electronic image signal processing means to increase the electronic zoom factor while simultaneously controlling the mechanical zoom means to reduce the mechanical zoom factor to substantially maintain said degree of magnification at said second level.

20. A video camera according to claim 14, wherein said control means operates to decrease the degree of magnification exhibited by the processed image signal from a first level of magnification to a second level of magnification lower than said first level of magnification by initially controlling the electronic image signal processing means to increase the electronic zoom factor while simultaneously controlling the mechanical zoom means to decrease the mechanical zoom factor to substantially maintain said degree of magnification at said first level, and then controlling the electronic image signal processing means to reduce the electronic zoom factor so as to reduce said degree of magnification from said first level to said second level.

* * * * *

UNITED STATES PATENT AND TRADEMARK OFFICE
CERTIFICATE OF CORRECTION

PATENT NO. : 5,684,532
DATED : November 4, 1997
INVENTOR(S) : Reuel Andrew Ely

It is certified that error appears in the above-identified patent and that said Letters Patent is hereby corrected as shown below:

Col. 2, line 19, delete "With" and insert --with--.

Col. 6, line 11, delete "$Z_m$" and insert --$Z_E$--.

Col. 6, line 12, delete "$Z_E$" and insert --$Z_M$--.

Col. 6, line 14, delete "$Z_G$" and insert --$Z_E$--.

Signed and Sealed this

Sixteenth Day of February, 1999

Attest:

Attesting Officer

Acting Commissioner of Patents and Trademarks